US011405400B2

(12) United States Patent
Gazit et al.

(10) Patent No.: US 11,405,400 B2
(45) Date of Patent: Aug. 2, 2022

(54) HARDENING BASED ON ACCESS CAPABILITY EXERCISE SUFFICIENCY

(71) Applicant: Microsoft Technology Licensing, LLC, Redmond, WA (US)

(72) Inventors: Jonathan Gazit, Tel Aviv (IL); Moshe Israel, Ramat-Gan (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 253 days.

(21) Appl. No.: 16/563,884

(22) Filed: Sep. 8, 2019

(65) Prior Publication Data

US 2021/0075794 A1    Mar. 11, 2021

(51) Int. Cl.
*H04L 9/40* (2022.01)
*H04L 43/0876* (2022.01)
*H04L 43/16* (2022.01)

(52) U.S. Cl.
CPC ........ *H04L 63/102* (2013.01); *H04L 43/0876* (2013.01); *H04L 43/16* (2013.01);
(Continued)

(58) Field of Classification Search
CPC ... H04L 63/102; H04L 43/0876; H04L 43/16; H04L 63/1425; H04L 63/1433;
(Continued)

(56) References Cited

U.S. PATENT DOCUMENTS 10,567,388 B1 *   2/2020   Kruse ............... H04L 63/10
10,986,131 B1 *   4/2021   Kruse ............... H04L 63/10
(Continued)

FOREIGN PATENT DOCUMENTS

WO       2018160409 A1    9/2018

OTHER PUBLICATIONS

Kawato et al., "A sufficiency-based resource reallocation mechanism for Internet-scale computer resource sharing," International Symposium on Applications and the Internet (SAINT'06) Year: 2006 | Conference Paper | Publisher: IEEE.*

(Continued)

*Primary Examiner* — Roderick Tolentino
(74) *Attorney, Agent, or Firm* — Ogilvie Law Firm

(57) ABSTRACT

Cybersecurity is improved by automatically finding underutilized access capabilities. Some embodiments obtain an access capability specification, gather access attempt data, and computationally determine that the access capability has not been exercised sufficiently, based on an access capability exercise sufficiency criterion. Security is then enhanced by automatically producing a recommendation to harden a guarded computing system by reducing, disabling, or deleting the insufficiently exercised access capability. In some cases, security enhancement is performed by automatically hardening the guarded computing system. Access capability exercise sufficiency determination may be based on fixed, statistical, or learned time period thresholds or activity level thresholds, or on a combination thereof using confidence levels. Thresholds are compared to a detected time period value or a detected activity level value that is derived from the access attempt data, to determine exercise sufficiency. Vulnerability mitigation may include requesting different authentication, blocking access, logging, alerting, or notifying.

20 Claims, 5 Drawing Sheets

(52) U.S. Cl.
CPC ...... *H04L 63/1425* (2013.01); *H04L 63/1433* (2013.01); *H04L 63/1441* (2013.01)

(58) Field of Classification Search
CPC . H04L 63/1441; H04L 63/1408; H04L 63/20; H04L 63/1416; G06F 21/604; G06F 21/552; G06F 21/577; G06F 2221/2141; H04W 12/35; G06Q 10/06
See application file for complete search history.

(56) References Cited

U.S. PATENT DOCUMENTS

| | | | |
|---|---|---|---|
| 2011/0019566 A1* | 1/2011 | Leemet | H04L 12/1403 370/252 |
| 2013/0097203 A1 | 4/2013 | Bhattacharjee et al. | |
| 2015/0200943 A1* | 7/2015 | Pitre | G06F 21/604 726/1 |
| 2016/0036833 A1* | 2/2016 | Ardeli | H04L 63/1408 726/22 |
| 2017/0163650 A1* | 6/2017 | Seigel | H04L 63/102 |
| 2017/0302659 A1 | 10/2017 | Shteingart et al. | |
| 2018/0096157 A1 | 4/2018 | Israel et al. | |
| 2018/0159891 A1 | 6/2018 | Sultan et al. | |
| 2018/0176227 A1 | 6/2018 | Israel et al. | |
| 2018/0247241 A1* | 8/2018 | Avrahami | G06N 20/00 |
| 2018/0248893 A1 | 8/2018 | Israel et al. | |
| 2018/0295149 A1 | 10/2018 | Gazit et al. | |
| 2018/0302430 A1 | 10/2018 | Israel et al. | |
| 2018/0359219 A1 | 12/2018 | Israel et al. | |
| 2018/0365412 A1 | 12/2018 | Israel et al. | |
| 2018/0375831 A1 | 12/2018 | Kliger et al. | |
| 2019/0005225 A1 | 1/2019 | Patrich et al. | |
| 2019/0007415 A1 | 1/2019 | Kliger et al. | |
| 2019/0327271 A1* | 10/2019 | Saxena | H04L 63/104 |
| 2020/0389375 A1* | 12/2020 | Haze | H04L 41/5051 |

OTHER PUBLICATIONS

Zhang et al., "Performance of mobile networks with wireless channel unreliability and resource insufficiency," IEEE Transactions on Wireless Communications Year: 2006 | vol. 5, Issue: 5 | Journal Article | Publisher: IEEE.*
"International Search Report and Written Opinion Issued in PCT Application No. PCT/US20/038268", dated Aug. 5, 2020, 11 Pages.
"Discretionary access control", retrieved from <<https://en.wikipedia.org/wiki/Discretionary_access_control>>, 3 pages, Apr. 12, 2019.
"Mandatory access control", retrieved from <<https://en.wikipedia.org/wiki/Mandatory_access_control>>, 3 pages, Jul. 9, 2019.
"Classified information", retrieved from <<https://en.wikipedia.org/wiki/Classified_information>>, 12 pages, Aug. 25, 2019.
"Permissions in Azure Security Center", retrieved from <<https://docs.microsoft.com/en-us/azure/security-center/security-center-permissions>>, Oct. 27, 2018, 3 pages.
"Working with security policies", retrieved from <<https://docs.microsoft.com/en-us/azure/security-center/tutorial-security-policy>>, Jul. 17, 2019, 14 pages.
"Administrator role permissions in Azure Active Directory", retrieved from <<https://docs.microsoft.com/en-us/azure/active-directory/users-groups-roles/directory-assign-admin-roles>>, Aug. 22, 2019, 94 pages.
"Azure security policies monitored by Security Center", retrieved from <<https://docs.microsoft.com/en-us/azure/security-center/security-center-policy-definitions>>, Aug. 21, 2019, 9 pages.
"Overview of the Azure Policy service", retrieved from <<https://docs.microsoft.com/en-us/azure/governance/policy/overview>>, Dec. 5, 2018, 10 pages.

* cited by examiner

SOME EXERCISE SUFFICIENCY 600 BASIS ASPECTS 602

| DETECTED TIME PERIOD 604 | USER SETTING 608 | FIXED INACTIVITY TIME PERIOD THRESHOLD 612 |
|---|---|---|
| DETECTED ACTIVITY LEVEL 606 | DEFAULT SETTING 610 | FIXED ACTIVITY LEVEL THRESHOLD 614 |

| STATISTICAL ACTIVITY LEVEL THRESHOLD 618, OPTIONAL CONFIDENCE 622 THRESHOLD 626 | STATISTICAL INACTIVITY TIME PERIOD THRESHOLD 616, OPTIONAL CONFIDENCE 620 THRESHOLD 624 |
|---|---|
| LEARNED ACTIVITY LEVEL THRESHOLD 630, OPTIONAL CONFIDENCE 634 THRESHOLD 638 | LEARNED INACTIVITY TIME PERIOD THRESHOLD 628, OPTIONAL CONFIDENCE 632 THRESHOLD 636 |

| ACCESS ACTION TYPE 640 | ACCESS ACTION SUCCESS 642 |

Fig. 6

SOME EXAMPLES OF SECURITY ENHANCEMENTS 700

VULNERABILITY 702 DISCOVERY 704

RISK 706 MITIGATION 708, E.G., CAPABILITY UPDATES 710

PRIVACY 712 COMPLIANCE 714

HARDENED ACCESS POLICY 410 ENFORCEMENT 716

INCREASED/FOCUSED AUTHENTICATION 718

INCREASED/FOCUSED ACCESS AUDITING 720

Fig. 7

HARDENING BASED ON ACCESS CAPABILITY EXERCISE SUFFICIENCY

BACKGROUND

Noon Attacks on computing systems take many different forms, including some forms which are difficult to predict, and forms which may vary from one situation to another. Accordingly, a guiding principle of cybersecurity is "defense in depth". In practice, defense in depth is often pursued by forcing attackers to encounter multiple different kinds of security mechanisms at multiple different locations around or within a computing system. No single security mechanism is able to detect every kind of cyberattack, or able to end every detected attack. But sometimes combining and layering a sufficient number and sufficient variety of defenses will deter an attacker, or will at least limit the scope of the harm caused by an attack.

However, even when accurate and current data are available for use in assessing potential or existing defenses, many choices remain to be made when trying to help secure a particular computing system. Different cybersecurity efforts often have different costs and benefits, which may vary between systems and may be judged differently by different people. Defenses that are considered effective in protecting one system against its attackers will not necessarily work as desired to protect a different system. Attackers continually change their tactics, techniques, and procedures, and cybersecurity professionals may pursue various preventive and reactive measures in turn. Cybersecurity defenses also impose costs, including computational resource costs like memory and processor cycles and network bandwidth, and human costs in administrative time and user time and decreases in the perceived or actual usability of information processing systems and services. Balancing costs and benefits is important, but difficult.

SUMMARY

Some embodiments described in this document provide improved security in particular access capability vulnerability situations. In some of these situations, a user has a permission, a clearance level, or another capability that is required to access a file, a service, a virtual machine, or another computational resource, but the user has apparently not exercised that access capability enough to justify allowing the access capability to remain in place.

Some access capability management embodiments described herein obtain an access capability specification which specifies an access capability installed in a guarded computing system. These embodiments also gather access attempt data representing detected activity which attempted to exercise the access capability. Then these embodiments computationally determine that the access capability has not been exercised sufficiently, based on an access capability exercise sufficiency criterion. These embodiments may then enhance security of the guarded computing system, based on a result of the determining.

In some cases, security enhancement is performed by an embodiment automatically producing a recommendation to harden the guarded computing system by reducing, disabling, or deleting the insufficiently exercised access capability. In some cases, security enhancement is performed by an embodiment automatically hardening the guarded computing system by reducing, disabling, or deleting the insufficiently exercised access capability.

In operation, some embodiments may use various technical mechanisms when computationally determining that the access capability has not been exercised sufficiently, e.g., mechanisms may be based in part on a fixed time period threshold, a fixed activity level threshold, a statistical time period threshold, a statistical activity level threshold, a learned time period threshold, a learned activity level threshold, or a combination thereof based on confidence levels. Thresholds may be compared to a detected time period value or a detected activity level value that is derived from the access attempt data.

In operation, some embodiments may use various technical mechanisms for balancing security vulnerability mitigation against potential interference with legitimate user activity, e.g., by requesting different authentication rather than simply blocking access, by logging or alerting or notifying as opposed to blocking access, by restricting impact on access capabilities in view of a privacy constraint, by avoiding resource group access capability reduction when only part of a resource group is being accessed, or by recognizing certain vulnerability scenarios which may give rise to unnecessary grants of access capability. Combinations of these may also be employed.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims as properly understood, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

FIG. 6 is a block diagram illustrating some aspects of asset capability exercise sufficiency determinations;

FIG. 7 is a block diagram illustrating some examples of security enhancements;

DETAILED DESCRIPTION

Overview

Figure 1:
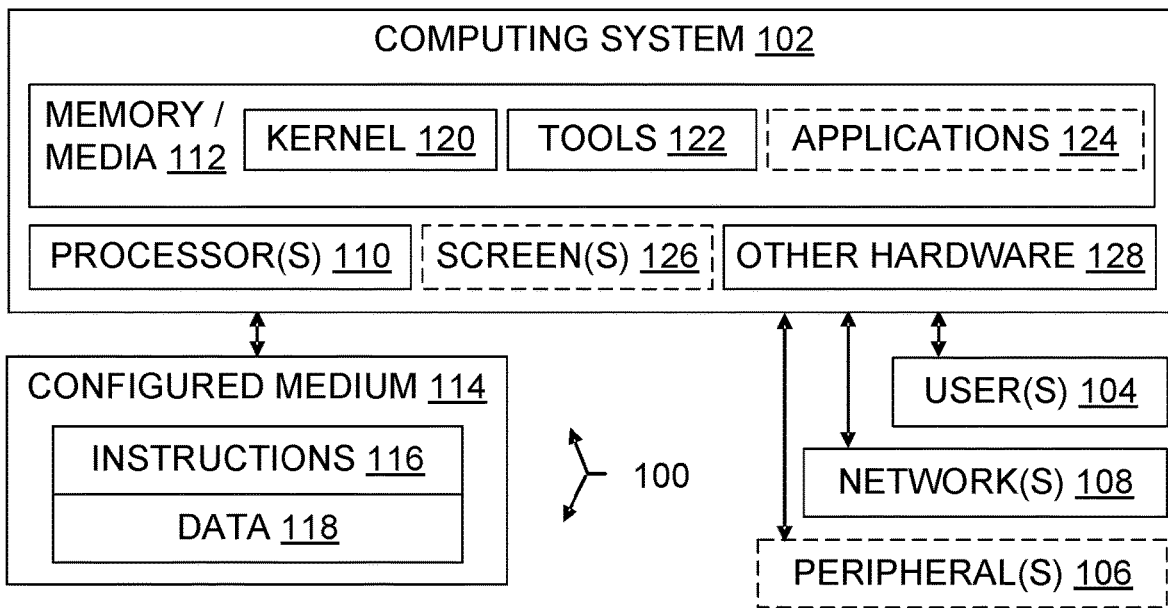
FIG. 1 is a block diagram illustrating computer systems generally and also illustrating configured storage media generally.

Innovations may expand beyond their origins, but understanding an innovation's origins can help one more fully appreciate the innovation. In the present case, some teachings described herein were motivated by technical challenges faced by Microsoft security innovators who were working to improve the security of Microsoft Azure® cloud offerings (mark of Microsoft Corporation). In addition to providing Azure® offerings commercially, Microsoft is itself a user of Azure® offerings. Hence, Microsoft is doubly motivated to monitor and improve Azure® security, both on behalf of Microsoft customers and to protect Microsoft's own cloud resources.

In particular, a technical challenge was to how to automatically identify permissions that had been granted to cloud users but were not being used. Such permissions are not necessarily problematic. In some cases, a permission may simply be unused at a given point in time because it was granted shortly before that point and will be used legitimately soon after that point. But in other cases, the permission may contribute to security problems, either because it was never needed, or because it was appropriate at one time in the past but is no longer needed. Permissions that are not currently needed for legitimate use may be vulnerabilities, because they may allow actions that cause accidental damage to a system, or allow malicious actions in the system, or both.

Sometimes an unnecessary permission is spotted manually by an administrator, and appropriate steps are taken to address it. For example, some entities may have an administrator perform a manual review of an employee's resource access permissions when the employee changes departments, or when the employee is terminated or retires. However, such manual reviews are often inconsistent and error-prone, when they are performed at all. In many entities, administrators are too busy with other more pressing tasks. By contrast, embodiments described herein can find unnecessary permissions automatically with little or no time burden on human personnel, and can do so in a consistent and reliable manner.

Also, in many situations administrators are not informed when an employee's responsibilities change in a way that makes previously granted permissions no longer necessary in order for the employee to perform the employee's new work duties. By contrast, embodiments described herein can find unnecessary permissions by finding permissions that have not been sufficiently exercised, regardless of whether an administrator is constantly updated about employee transfers, terminations, retirements, and duty changes.

These consistency and convenience benefits are merely examples. One of skill will recognize that the teachings provided herein have beneficial applicability to many other scenarios as well.

Several observations about an access capability that has not been sufficiently exercised may be made by one acquainted with the teachings herein. First, the user who could legitimately exercise the capability is not using it and thus apparently does not need it. Second, as long as the capability remains in place, it might be exercised inadvertently or maliciously. Thus, an insufficiently exercised access capability is a security vulnerability, and security may well be enhanced by reducing, disabling, or deleting it. Short of that, even the act of bringing the presence of the insufficiently exercised access capability to the attention of an administrator or a security team member can enhance security, because doing so provides them with a more accurate view of the vulnerabilities they face. To an inventive person, these observations also raise some technical questions, such as how to automatically find an access capability that has not been sufficiently exercised, and how to enhance security in response to such a finding without interfering unduly with legitimate user activities.

One of skill will recognize that the embodiments described herein are not necessarily complete security solutions, not even to the particular problem of unnecessary permissions. Some unnecessary permissions might not be found by a given embodiment, such as unnecessary permissions that were granted too recently to be distinguished by their lack of use, and unnecessary permissions whose use or lack thereof is not well documented in the available logs, audit trails, and other access activity sources. However, embodiments taught herein may nonetheless be used with other tools or security controls, in a layered or side-by-side manner, to enhance security. Indeed, an understanding of the teachings herein may encourage one of skill to ensure the sufficiency of logging and other access activity detection mechanisms in terms of accuracy, currency, breadth, and depth.

Some embodiments described herein may be viewed by some people in a broader context. For instance, concepts such as access, need, permission, security, and sufficiency may be deemed relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems, such as how to determine from usage logs whether removing an access capability will likely interfere with legitimate use of a guarded computing system. Other configured storage media, systems, and processes involving access, need, permission, security, or sufficiency are outside the present scope. Accordingly, vagueness, mere abstractness, lack of technical character, and accompanying proof problems are also avoided under a proper understanding of the present disclosure.

More generally, one of skill will recognize that not every part of this disclosure, or any particular details therein, are necessarily required to satisfy legal criteria such as enablement, written description, or best mode. Also, embodiments are not limited to the particular motivating examples, requests, responses, scenarios, operating systems, software development environments, programming languages, software processes, development tools, identifiers, files, data structures, notations, control flows, pseudocode, naming conventions, resource types, access actions, or other implementation choices described herein. Any apparent conflict with any other patent disclosure, even from the owner of the present innovations, has no role in interpreting the claims presented in this patent disclosure.

Technical Character

The technical character of embodiments described herein will be apparent to one of ordinary skill in the art, and will also be apparent in several ways to a wide range of attentive readers. Some embodiments address technical activities such as communications between a user device and a resource device (one containing a computational resource) in a cloud or other computer network, access control attempted based on permissions, or automatic enforcement of security policies to control access to digital data, which are each activities deeply rooted in computing technology. Some of the technical mechanisms discussed include, e.g., activity logs, access permissions, discretionary access control systems, mandatory access control systems, privacy constraints, particular statistical calculations, and trained machine learning models. Some of the technical effects discussed include, e.g., automatic detection of apparently unused or otherwise insufficiently exercised access capabilities, system hardening by vulnerability reduction or removal, avoidance of interference with legitimate user activity due to system hardening, privacy constraint compliance while hardening a system, increased or better focused authentication, and increased or better focused access activity auditing or logging. Thus, purely mental processes are clearly excluded. Some embodiments improve the functioning of computing systems and services by identifying, reducing, or removing vulnerabilities in the form of unnecessary access capabilities. Other advantages based on the technical characteristics of the teachings will also be apparent to one of skill from the description provided.

Acronyms, Abbreviations, Names, and Symbols

Some acronyms, abbreviations, names, and symbols are defined below. Others are defined elsewhere herein, or do not require definition here in order to be understood by one of skill.
ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GPU: graphical processing unit
GUI: graphical user interface
GUID: globally unique identifier
HTTP: hypertext transfer protocol
HTTPS: hypertext transfer protocol secure
IaaS or IAAS: infrastructure-as-a-service
ID: identification or identity
IDE: integrated development environment
IoT: internet of things
IP: internet protocol
LAN: local area network
OS: operating system
PaaS or PAAS: platform-as-a-service
RAM: random access memory
ROM: read only memory
SIEM: security information and event management; also refers to SIEM tools
SSL: secure sockets layer
TLS: transport layer security
UEFI: Unified Extensible Firmware Interface
URI: uniform resource identifier
URL: uniform resource locator
VM: virtual machine
VPN: virtual private network
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" (a.k.a. "computing system") may include, for example, one or more servers, motherboards, processing nodes, laptops, tablets, personal computers (portable or not), personal digital assistants, smartphones, smartwatches, smartbands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

"Service" means a consumable program offering, in a cloud computing environment or other network or computing system environment, which provides resources or resource access to multiple programs.

"Cloud" means pooled resources for computing, storage, and networking which are elastically available for measured on-demand service. A cloud may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write).

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance or household fixture; (g) embedment in an implanted or wearable medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, physical security, or physical transportation system monitoring. IoT storage may be a target of unauthorized access, either via a cloud, via another network, or via direct local access attempts.

"Access" to a computational resource includes use of a permission or other capability to read, modify, write, execute, or otherwise utilize the resource.

Attempted access may be explicitly distinguished from actual access, but "access" without the "attempted" qualifier includes both attempted access and access actually performed or provided.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Access control operations such as issuing a request for access to a digital asset or other computational resource, automatically granting or denying an access request, and many other operations discussed herein, are understood to be inherently digital. A human mind cannot interface directly with a CPU or other processor, or with RAM or other digital storage, to read and write the necessary data to perform the access capability management steps taught herein. This would all be well understood by persons of skill in the art in view of the present disclosure, but other people may sometimes need to be informed of this, or reminded of it.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/ or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated features is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this innovation disclosure discusses various data values and data structures, and recognize that such items reside in a memory (RAM, disk, etc.), thereby configuring the memory. One of skill will also recognize that this innovation disclosure discusses various algorithmic steps which are to be embodied in executable code in a given implementation, and that such code also resides in memory, and that it effectively configures any general purpose processor which executes it, thereby transforming it from a general purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as accessing, alerting, assigning, blocking, calculating, collecting, comparing, computing, confirming, controlling, deleting, denying, deriving, detecting, determining, disabling, enhancing, exercising, finding, focusing, gathering, generating, getting, granting, guarding, hardening, increasing, logging, managing, notifying, obtaining, performing, producing, providing, receiving, reducing, requesting, residing, restricting, sending, setting, specifying, training, transitioning, using, verifying (and accesses, accessed, alerts, alerted, etc.) with regard to a destination or other subject may involve intervening action such as forwarding, copying, uploading, downloading, encoding, decoding, compressing, decompressing, encrypting, decrypting, authenticating, invoking, and so on by some other party, including any action recited in this document, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

100 operating environment, also referred to as computing environment 102 computer system, also referred to as computational system or computing system 104 users 106 peripherals 108 network generally, including, e.g., LANs, WANs, software defined networks, clouds, and other wired or wireless networks 110 processor 112 computer-readable storage medium, e.g., RAM, hard disks 114 removable configured computer-readable storage medium 116 instructions executable with processor; may be on removable storage media or in other memory (volatile or non-volatile or both)

118 data 120 kernel(s), e.g., operating system(s), BIOS, UEFI, device drivers 122 tools, e.g., anti-virus software, firewalls, packet sniffer software, intrusion detection systems, intrusion prevention systems, debuggers, profilers, compilers, interpreters, decompilers, assemblers, disassemblers, source code editors, autocompletion software, simulators, fuzzers, repository access tools, version control tools, optimizers, collaboration tools, software development tools and tool suites, hardware development tools and tool suites, diagnostics, and so on 124 applications, e.g., word processors, web browsers, spreadsheets, games, email tools 126 display screens, also referred to as "displays"

128 computing hardware not otherwise associated with a reference number 106, 108, 110, 112, 114

200 access capability, e.g., a permission, credential, token, certificate, clearance level, pass phrase, password, membership, validation, or other digitally implemented capability which provides authentication or authorization (or both) in a computing system 202 access capability exercise activity, e.g., supplying a credential or other access capability, requesting access to a computational resource, or gaining access to a computational resource; may also be referred to as an "access capability exercise attempt" or as "exercising an access capability", for example 204 access capability exercise attempt data, e.g., audit trail, log, alert; may also be referred to as "attempt outcome data" as it may include data indicating an outcome of an access attempt as well as data indicating that an access attempt was made 206 guarded computing system, namely, a system 102 which contains a computational resource to which access is or was attempted 208 system configuration data, including in particular access capability configuration data such as default accounts, default passwords, and default permissions 210 access controls, e.g., controls employed in a discretionary access control system or controls employed in a mandatory access control system; may include, e.g., access control lists (ACLs), authentication protocols, authorization protocols, file or directory permissions, etc.

212 computational resource; may be, e.g., a stored resource such as a file or blob, a calculation resource such as a virtual machine or a cloud service, or a network resource such as an endpoint or a network stack or network interface; may be any item stored digitally or transmitted digitally or processed digitally which has its own name, own address, or existence as a distinguishable unit in a computing system 214 access capability management system; may be part of a guarded system 206 or be distinct from its guarded system(s)

216 access capability exercise sufficiency criterion, that is, criterion for determining whether an access capability has been sufficiently exercised; may be a simple test against one threshold, or may be a Boolean combination of tests 218 access capability management code 300 aspect of a computing environment 302 cloud; may also be referred to as "cloud computing environment"

304 production environment 306 virtual machine, e.g., a computing construct which provides hardware virtualization and includes an operating system 308 container, e.g., a computing construct which provides user space virtualization and does not itself include an operating system but is nonetheless reliant upon an operating system to execute 310 integrated development environment (IDE)

400 access capability management system with privileges data collector, access data collector, and access policy generator; system 400 is an example of an access capability management system 214

404 privileges data collector 408 access data collector 410 access policy 412 access policy generator 414 access policy violation 416 access policy violation detector 418 access policy hardening recommendation 420 access policy hardening recommendation producer 422 access capability specification, e.g., a listing of output from a *nix "ls-la" command to list all files including hidden files and their attributes, or output from a PowerShell® Get-ACL cmdlet (mark of Microsoft Corporation), or a data structure derived from such output or containing similar data, or another data structure with access capability data about items such as access tokens, digital certificates, or security items for use with HTTPS, SSL, TLS, Kerberos software, IPSec, VPN software, authentication software, or authorization software, for example 424 user interface; may include one or more of a command line interface, a graphical user interface (GUI), an application program interface (API), or a web service interface, for example 426 machine learning model (at least partially trained)

428 data used in training or testing a machine learning model 430 machine learning model interface which provides learned threshold 500 aspect of guarded system 502 discretionary access control system; per the Trusted Computer System Evaluation Criteria, discretionary access control (DAC) includes "a means of restricting access to objects based on the identity of subjects and/or groups to which they belong. The controls are discretionary in the sense that a subject with a certain access permission is capable of passing that permission (perhaps indirectly) on to any other subject (unless restrained by mandatory access control)". *nix file read-write-execute user-group-world permissions are an example of discretionary access control.
- 504 mandatory access control system; per Wikipedia, with mandatory access control "Subjects and objects each have a set of security attributes. Whenever a subject attempts to access an object, an authorization rule enforced by the operating system kernel examines these security attributes and decides whether the access can take place." Per the Trusted Computer System Evaluation Criteria, mandatory access control provides "a means of restricting access to objects based on the sensitivity (as represented by a label) of the information contained in the objects and the formal authorization (i.e., clearance) of subjects to access information of such sensitivity."
- 506 actor, e.g., user, thread, computational process, application
- 508 actor identification
- 510 group; may be an actor group or a resource group or a combination thereof
- 512 group identification
- 514 role
- 516 role identification
- 518 security clearance level
- 520 security classification
- 522 access permission
- 524 need-to-know identification
- 526 computational resource identification
- 528 privacy constraint
- 600 exercise sufficiency, that is, the sufficiency of the evident exercise of an access capability
- 602 aspects of basis of exercise sufficiency, e.g., values upon which an exercise sufficiency determination may be based
- 604 detected time period
- 606 detected activity level
- 608 user setting
- 610 default setting
- 612 fixed inactivity time period threshold
- 614 fixed activity level threshold
- 616 statistical inactivity time period threshold
- 618 statistical activity level threshold
- 620 confidence in statistical inactivity time period threshold
- 622 confidence in statistical activity level threshold
- 624 threshold for confidence in statistical inactivity time period threshold
- 626 threshold for confidence in statistical activity level threshold
- 628 learned inactivity time period threshold
- 630 learned activity level threshold
- 632 confidence in learned inactivity time period threshold
- 634 confidence in learned activity level threshold
- 636 threshold for confidence in learned inactivity time period threshold
- 638 threshold for confidence in learned activity level threshold
- 640 access action type
- 642 access action success indication
- 700 security enhancement
- 702 security vulnerability, e.g., something that can be exploited by a threat actor to violate confidentiality, integrity, or availability
- 704 security vulnerability discovery, including an identification of a vulnerability
- 706 risk, e.g., the likelihood that a vulnerability will be exploited
- 708 risk mitigation, e.g., something that reduces or eliminates a risk
- 710 access capability update, e.g., change to an access capability
- 712 privacy; may be distinguished from confidentiality in that confidentiality pertains to limits on who has access to information whereas privacy pertains to legal rights that involve not only confidentiality but also limits on how information is used, where information is used, whether information can be checked for accuracy and corrected if inaccurate or incomplete, and so on
- 714 privacy compliance, e.g., compliance with the General Data Protection Regulation (GDPR) in Europe and several jurisdictions outside Europe, the Health Insurance Portability and Accountability Act (HIPAA) in the United States, the Personal Information Security Specification in the People's Republic of China, or similar privacy constraints 528
- 716 hardened access policy enforcement
- 718 increased or otherwise better focused authentication activities or requirements; "better" means more accurate, more efficient, more effective, faster, requiring less memory, etc.
- 720 increased or otherwise better focused auditing activities or requirements
- 800 access capability management flowchart; 800 also refers to access capability management methods illustrated by or consistent with the FIG. 8 flowchart, and to the access capability management actions of such a method
- 802 obtain an access capability management specification 422 identifying an access capability
- 804 specify an access capability
- 806 gather access attempt data
- 808 represent access activity
- 812 determine whether an access capability has been sufficiently exercised to justify its continued unmodified presence
- 814 enhance security of a computing system; may be an enhancement of security of the computing system's hardware, software, or data, for example
- 816 produce a hardening recommendation
- 818 harden a computing system
- 900 flowchart; 900 also refers to access capability management methods illustrated by or consistent with the FIG. 9 flowchart (which incorporates the steps of FIG. 8)
- 902 reduce an access capability
- 904 disable an access capability
- 906 delete an access capability
- 908 assign an access permission
- 910 reside at least in part in a computing system's access control system
- 912 be controlled at least in part by a computing system's access control system
- 914 collect privileges data
- 916 collect access data
- 918 automatically generate an access policy
- 920 derive a detected time period from access activity data 922 derive a detected activity level from access activity data
924 get a threshold value from a user setting or a default setting
926 calculate a statistical time period threshold
928 calculate a statistical activity level threshold
930 provide a learned time period threshold
932 provide a learned activity level threshold
934 compare a value to a threshold
936 disallow access action(s) of a particular type
938 block access
940 request authentication
942 log access activity
944 alert; may also be referred to as "raise an alert"
946 notify an authority
948 transition between fixed threshold and calculated (statistical or learned) threshold
950 confirm that resources share a permission
952 verify that access to each of multiple resources has not been sufficiently exercised
954 restrict operations in order to comply with a privacy constraint
956 meet a risk scenario
958 risk scenario
960 any step discussed in the present disclosure that has not been assigned some other reference numeral Operating Environments With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A screen 126 may be a removable peripheral 106 or may be an integral part of the system 102. A user interface may support interaction between an embodiment and one or more human users. A user interface may include a command line interface, a graphical user interface (GUI), natural user interface (NUI), voice command interface, and/or other user interface (UI) presentations, which may be presented as distinct options or may be integrated.

System administrators, network administrators, cloud administrators, security analysts and other security personnel, operations personnel, developers, testers, engineers, auditors, and end-users are each a particular type of user 104. Automated agents, scripts, playback software, devices, and the like acting on behalf of one or more people may also be users 104, e.g., to facilitate testing a system 102. Storage devices and/or networking devices may be considered peripheral equipment in some embodiments and part of a system 102 in other embodiments, depending on their detachability from the processor 110. Other computer systems not shown in FIG. 1 may interact in technological ways with the computer system 102 or with another system embodiment using one or more connections to a network 108 via network interface equipment, for example.

Each computer system 102 includes at least one processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, solid-state media, and/or of other types of physical durable storage media (as opposed to merely a propagated signal or mere energy). In particular, a configured storage medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se or mere energy under any claim pending or granted in the United States.

The storage medium 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

A given operating environment 100 may include an Integrated Development Environment (IDE) 122, 310 which provides a developer with a set of coordinated computing technology development tools 122 such as compilers, interpreters, decompilers, assemblers, disassemblers, source code editors, profilers, debuggers, simulators, fuzzers, repository access tools, version control tools, optimizers, collaboration tools, and so on. In particular, some of the suitable operating environments for some software development embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but many teachings herein are applicable with a wide variety of programming languages, programming models, and programs.

Although an embodiment may be described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In addition to processors 110 (e.g., CPUs, ALUs, FPUs, and/or GPUs), memory/storage media 112, and displays 126, an operating environment may also include other hardware 128, such as batteries, buses, power supplies, wired and wireless network interface cards, for instance. The nouns "screen" and "display" are used interchangeably herein. A display 126 may include one or more touch screens, screens responsive to input from a pen or tablet, or screens which operate solely for output. In some embodiments peripherals 106 such as human user I/O devices (screen, keyboard, mouse, tablet, microphone, speaker, motion sensor, etc.) will be present in operable communication with one or more processors 110 and memory.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which may be present in a given computer system. Virtualizations of networking interface equipment and other network components such as switches or routers or firewalls may also be present, e.g., in a software defined network or a sandboxed or other secure cloud computing environment. A given embodiment may also communicate technical data and/or technical instructions through direct memory access, removable nonvolatile storage media, or other information storage-retrieval and/or transmission approaches.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the current innovations.

More About Systems

With reference to FIGS. 1 through 7, some embodiments use or provide a functionality-enhanced system 400. The functionality enhancement promotes cybersecurity and usability by facilitating consistent and convenient access capability management to reduce a guarded system's attack surface without undue interference in legitimate user activity. This reduction in system 206 vulnerability is accomplished in some embodiments by automatically finding file access permissions, access tokens, accounts, digital certificates usable for authentication or authorization, and other access capabilities 200 that have been granted but are apparently not being used much, if at all. Such underutilized access capabilities can then be reduced in scope, or be disabled but left on the system 206 in case they are needed thereafter, or be deleted completely from the guarded system 206.

Figure 2:
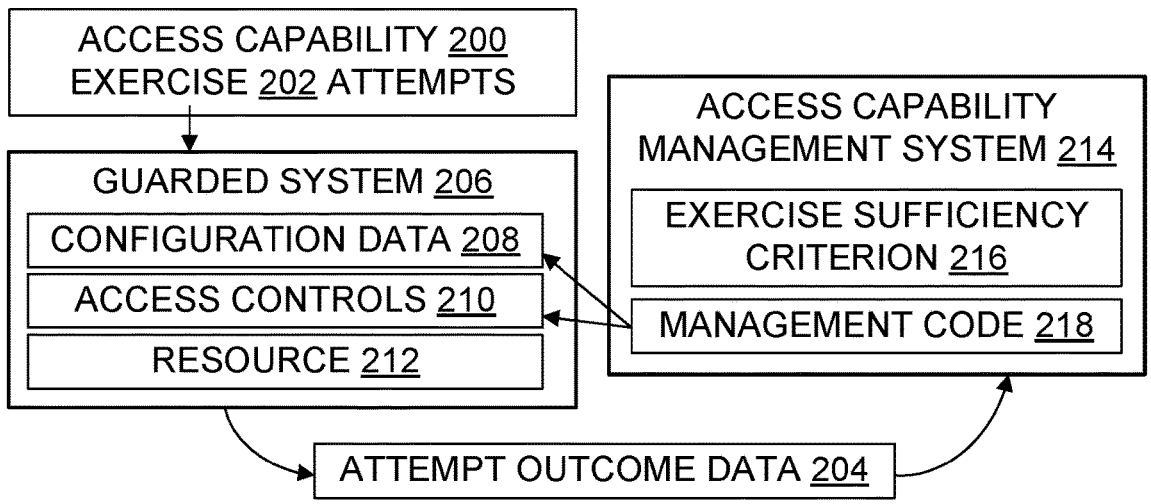
FIG. 2 is a block diagram illustrating an environment which includes a guarded computing system having a computational resource, some attempts to access the computational resource, and an access capability management system with an exercise sufficiency criterion.

As shown in the example of FIG. 2, user activities to access resources 212 of a guarded system 206 can be viewed as exercises 202 of access capabilities 200. For instance, attempting to read a file 212 is an exercise 202 of the read permissions associated with the file, such as user, group, and world read permissions that respectively allow or disallow the user, the user's group, and users in general access to read the file. Submitting an access token to an access control system 210 of a federated system 206 or a single-sign-on system 206 is an exercise 202 of the access token as an access capability 200. Pointing a browser 122 to a TLS digital certificate is an exercise 202 of that certificate as an access capability 200. One of skill will understand that many other examples can also be provided.

When appropriate logging, auditing, tracing, shadowing, or other access activity recordation mechanisms are installed and operating, these access exercises 202 result in attempt outcome data 204. What is deemed appropriate may vary between embodiments, but in general the attempt outcome data 204 is the primary or sole basis for determining whether an access capability has been sufficiently exercised, so one of skill will ensure the availability and accuracy of a recording of access activity that is adequate to support the desired exercise sufficiency 600 determinations. For example, an embodiment may focus on finding underutilized administrative permissions, such as dormant admin accounts, as opposed to finding all underutilized permissions. In that case, fine-grained logging of admin account access activity would be highly advised, but logging non-admin accounts would not be as high a priority.

With continued attention primarily on FIG. 2, the access capabilities 200 of the guarded system may be at least partially defined by configuration data 208. For example, IPSec software creates security associations which define access capabilities 200. Also, many guarded systems 206 have default accounts, with default passwords or other default access capabilities 200, which are defined at least in part by system configuration data 208. In general, configuration data 208 includes any potential source of access capability specifications 422.

As also shown in FIG. 2, the search for underutilized access capabilities is performed by access capability management code 218 of an access capability management system 214. Whether a given capability 200 is underutilized (that is, insufficiently exercised) is determined automatically on the basis of an exercise sufficiency criterion 216. The exercise sufficiency criterion 216 may involve an absolute and fixed value that was provided by a user or provided as a default value, e.g., a fixed value indicating that any access token which has not been used within 5 days will be deleted, or a fixed value indicating that any file which has not been written in the past 90 days will be made read-only. As explained elsewhere herein, the exercise sufficiency criterion 216 may also involve a relative and calculated value, e.g., one indicating that any account which has not been logged into within one standard deviation of the time between logins of accounts of cloud tenant X will be subject to supplemental authentication requirements, or one indicating that archiving (with retrieval access restrictions) will be recommended for any directory whose access activity level is abnormal according to a machine learning model.

Figure 3:
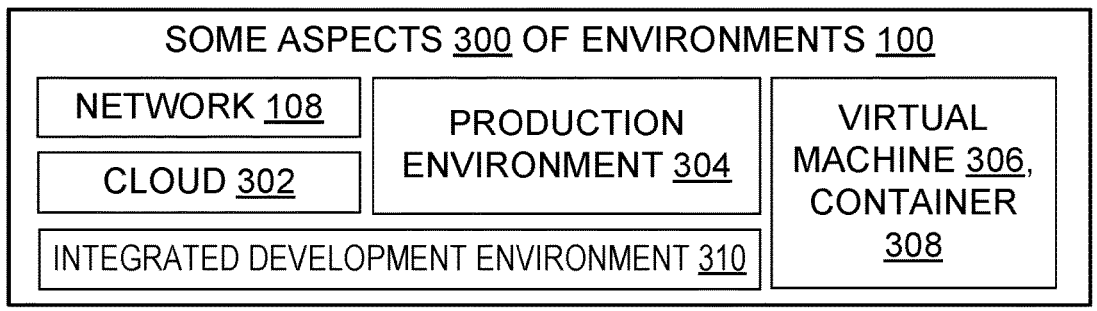
FIG. 3 is a block diagram illustrating some aspects of some computing environments.

FIG. 3 shows some additional aspects 300 of some environments 100, which are not necessarily mutually exclusive of each other. The illustrated aspects include a cloud 302, virtual machines 306 and containers 308, a network 108 generally, a production environment 304, and an integrated development environment 310.

Figure 4:
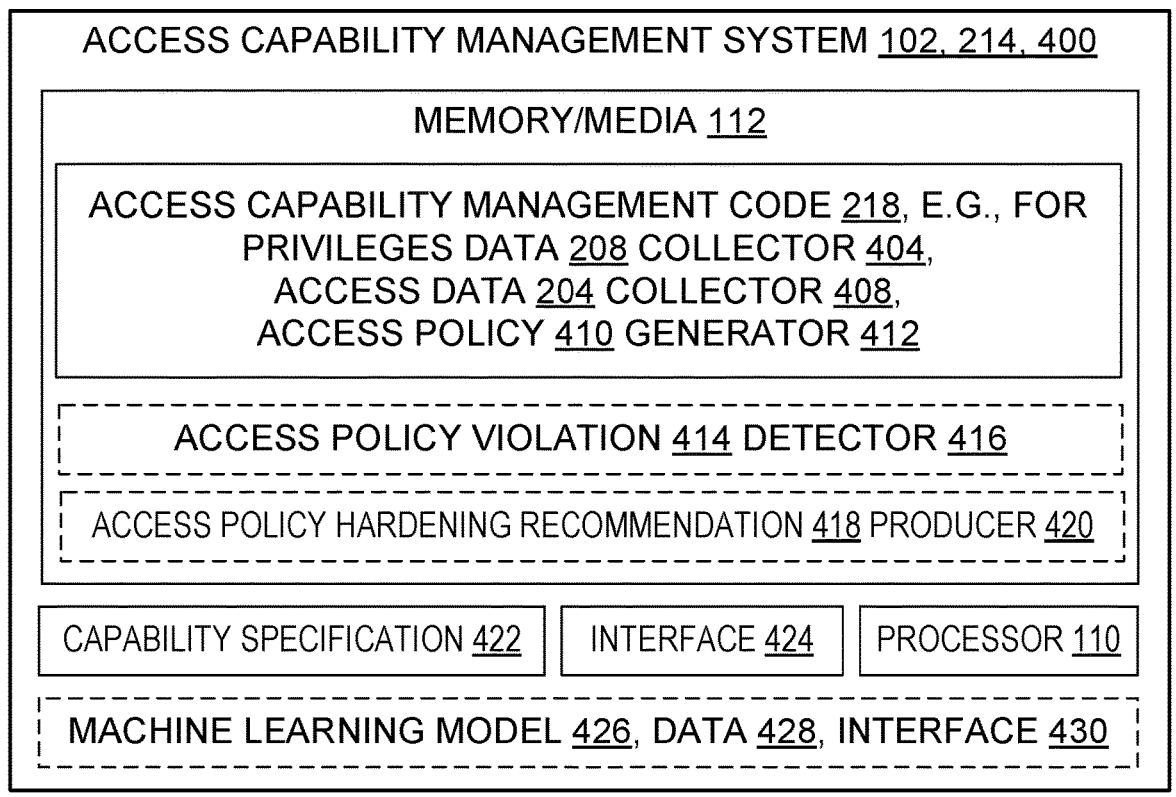
FIG. 4 is a block diagram illustrating aspects of a system which is configured with an access capability management functionality.

FIG. 4 further illustrates some embodiments of an access capability management system 400. The illustrated system 400 includes software 218 organized in a particular way, namely, with a privileges data collector 404, an access data collector 408, and an access policy generator 412. Other embodiments consistent with teachings herein may organize access capability management functionality differently.

In some embodiments, the privileges data collector 404 collects permission configuration data 208 that define which actors 506 (e.g., users, groups or applications) can access which resources. For example, in some Azure® environments, the privileges data collector 404 collects 914 this data by polling or listening on Microsoft.Authorization, a resource provider which holds information indicating which identities can access which resources in the Azure® environment (mark of Microsoft Corporation). The privileges data collector 404 may fetch information of the form "[identityA] is permitted to access [ResourceB] with permission of [TypeC]". The permission type (sometimes also referred to as a "role") can have values such as "ReadOnly", "ReadWrite", "Admin", and so on.

In some embodiments, the access data collector 408 collects 916 access request metadata 204 from an authorization authority. In some embodiments, the collected information 204 does not necessarily include usage data (e.g., how the user has been using the resource) but only includes access metadata (e.g., when access was attempted). In some embodiments, the collected access data 204 can be represented as "[identityA] was successfully authorized to access [ResourceB] with permission of [TypeC]", for example.

In some embodiments, privileges data collector 404 and access data collector 408 can each work in a push mode in real-time, or work in a pull mode in which the collection is triggered by a pre-defined schedule, for example.

In some embodiments, once the privileges data 208 and the access data 204 are available, they are sent to the access policy generator 412. In order to create a hardened access policy 410, the access policy generator 412 cross-joins or otherwise compares the permissions configuration with the actual resources access requests to find permissions that are not in use.

In some embodiments, a policy 410 can be calculated in one or more of the following ways. In a fixed approach, a user pre-defines a fixed value 612 or 614 and the policy accordingly may be understood as defining an exercise sufficiency criterion 216 such as, e.g., "A user has not accessed a resource in the last X days" or "An application has not accessed a resource in the last Y days". In a relative (relative to access data) approach, machine learning or statistical calculations, or both, are employed. Thus, an embodiment may learn what value qualifies as an inactivity time interval threshold 628 that would distinguish a non-required access configuration from one being sufficiently utilized, for each identity or each resource. In place of machine learning, or in concert with it, an exercise sufficiency criterion 216 may be calculated by statistical methods. A blended approach transitioning between fixed thresholds and relative thresholds in criteria 216 may be used in some embodiments. The user can set confidence threshold 624, 626, 636, or 638 rules to alter between the fixed and relative criteria 216 based on the level of confidence 620, 622, 632, or 634 in the calculated (statistical or learned) value. For instance, in one embodiment if a learned value 628 or 630 has an associated confidence above a 0.7 threshold 636 or 638 on a scale from zero to one, then the learned value will be used in the criterion 216, and otherwise a fixed value 612 or 614 supplied by the user will be employed in the exercise sufficiency criterion 216.

In some embodiments, the user can support hierarchical authorization systems. For example, some embodiments will harden a resource group level access capability 200 only if all resources 212 belonging to the resource group qualify for hardening in view of the exercise sufficiency criterion 216.

As indicated by the dashed lines in FIG. 4, some embodiments include an access policy hardening recommendation producer 420. The producer 420 uses a policy 410 generated 918 by the policy generator 412 to issue hardening recommendations 418 to be applied by administrative or security personnel; the recommendations 418 are applied automatically by the software code 218 in some cases in some embodiments. The recommendations 418 may include, e.g., comments or another portion containing a human-readable list of vulnerabilities 702 and suggested hardening steps, such as "File abcd.exe has been written substantially less often than the other files in its directory; you may wish to remove this file's write permissions. Account foojefe has not been logged into for 37 days; you may wish to archive this account's contents and delete this account." In some embodiments, recommendations 418 may also include an automatically generated list of system configuration commands which, upon execution, will perform the recommended hardening operations. The list may be editable.

Recommendation 418 production and other communications with the access capability management system 400 can be done through a command line, a graphical user interface, an API, or through another interface 424. In some embodiments, a user can examine existing configurations and new proposed configurations, review the differences between them, optionally edit the proposed configuration (e.g., to add or remove actors) and apply the revised configuration to harden the guarded system 206.

As indicated by the dashed lines in FIG. 4, some embodiments include an access policy violation detector 416. The detector 416 monitors new access requests and validates them against the policy 410 created by the policy generator 412. In some embodiments, the policy violation detector 416 can run in an audit mode or run in an enforcement mode.

In enforcement mode, in some embodiments the access policy violation detector 416 monitors access requests 202 in real-time, in-line with the guarded system's authorization component(s). When an access request violates the policy 410, one or more enforcement actions are taken. As an enforcement action, for example, the access may be automatically blocked, or a stronger authentication such as multifactor authentication (MFA) may be required. Also, a log entry may be made or an alert may be emitted to the user or a security admin.

In audit mode, in some embodiments the access policy violation detector 416 can run online, offline, or both. When a new access request 202 violates a policy 410 an alert or notification is sent to the user or security admin.

In some embodiments, the access capability management system 214 can be focused such that only a subset of actors 506, or a subset of resources 212, or subsets of both, are subject to monitoring or automatic hardening or both. This operational restriction may be done for efficiency, or to comply with privacy standards, for instance. For example, access capability management operations may be restricted to relatively new user accounts, to administrative accounts, to accounts and resources of customers who pay extra for that service, to accounts of people who reside within (or reside without) specified countries or regions, to resources that are stored physically within (or without) specified countries or regions, to resources containing or associated with human health information, to resources containing or associated with personally identifying information, to resources containing or associated with information that is subject to regulatory control, and so on.

Unlike some approaches, some embodiments discussed herein provide or perform security posture management based on actual access monitoring, as opposed to relying solely on standard security practices that do not reflect actual activity in a particular guarded system 206. Some embodiments offer or implement recommendations 418 that leverage actual guarded system 206 access monitoring, in order to reduce the guarded system's attack surface.

Figure 5:
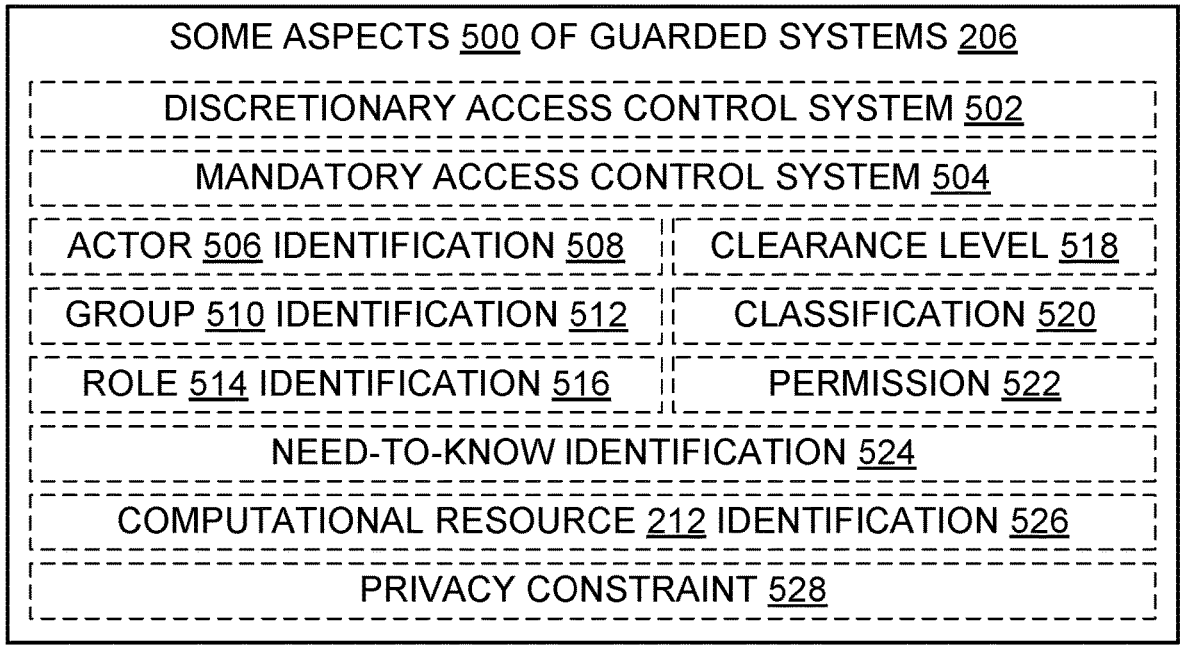
FIG. 5 is a block diagram illustrating some aspects of guarded systems.

FIG. 5 shows some aspects 500 of some guarded systems 206. The illustrated aspects include a discretionary access control system 502, and a mandatory access control system 504. Clearance levels 518 and classifications 520 are often part of a mandatory access control system 504. Some mandatory access control systems 504 enforce need-to-know 524 limitations on access. Innovations described herein are compatible with discretionary access control, with mandatory access control, with mixtures thereof, and with other forms of access control. Many access control systems include roles 514 for role-based access control, and many access control systems include groups 510 such as workgroups or *nix file permission groups.

FIG. 6 shows some aspects 602 which may form part of a computational basis of an exercise sufficiency criterion 216. The illustrated aspects are discussed as appropriate throughout this disclosure.

FIG. 7 shows some examples of security enhancements 700 that an embodiment may provide or improve. The illustrated security enhancements 700 include better discovery 704 of vulnerabilities, in particular the revelation to authorized administrators or security personnel of underutilized access capabilities such as apparently unnecessary (for legitimate purposes, at least) permission grants, access tokens, digital certificates, and accounts, e.g., in the form of recommendations 418. An enhancement may mitigate 708 risk 706 by updating 710 such underutilized access capabilities 200 to reduce or remove them, so they cannot be exploited by accident or maliciously. Better privacy 712 compliance 714 may be provided by automatically double-checking updates 710 (manual or automatic) against privacy constraints 528. Through the operation of an access policy violation detector 416 in enforcement mode, or otherwise by application of teachings provided herein, enforcement 716 of hardened policies 410 may enhance security. Likewise, authentication 718 and security auditing 720 may be enhanced directly through the operation of an access policy violation 414 detector 416, or otherwise by application of teachings provided herein.

Some embodiments use or provide an access capability management system 214 or 400 which includes an access control memory 112 and an access control processor 110 in operable communication with the access control memory. The access control processor is configured to perform access capability management steps which include (a) obtaining 802 an access capability specification 422 which specifies 804 an access capability 200 installed in a guarded computing system 206, (b) gathering 806 access attempt data 204 representing detected activity 202 which attempted to exercise the access capability 200, (c) computationally determining 812 that the access capability 200 has not been exercised sufficiently, based on an access capability exercise sufficiency criterion 216, and (d) enhancing 814 security of the guarded computing system 206 based on a result of the determining 812.

In some embodiments, enhancing 814 security of the guarded computing system includes producing 816 a recommendation 418 to harden the guarded computing system 206 by reducing, disabling, or deleting the access capability 200 after computationally determining that the access capability has not been exercised sufficiently.

In some embodiments, enhancing 814 security of the guarded computing system includes hardening 818 the guarded computing system by reducing, disabling, or deleting the access capability after computationally determining that the access capability has not been exercised sufficiently. In some, the hardening is performed proactively by automation such as management code 218.

In some embodiments, the access capability 200 resides in or is controlled by an access control system 210 of the guarded computing system 206. Such an access control system may include, for example, a discretionary access control system 502, a mandatory access control system 504, or both.

In some embodiments, the access capability specification 422 is a digital artifact which includes at least one of the following: an actor 506 identification 508, a group 510 identification 512, a role 514 identification 516, a computational resource 212 identification 526, an assigned permission 522 regarding access to a computational resource 212, or an assigned permission 522 regarding a computational resource access activity 640 such as a read, write, execute, or modify access permission. In some embodiments, the access capability specification 422 is a digital artifact which includes at least one of the following: a computational resource classification 520, a security clearance level 518, a need-to-know identification 524, or a privacy constraint 528. A given embodiment may also include or exclude any one or more of the foregoing examples of access capability specification 422 content.

In some embodiments, the system 214 is a system 400 that includes a privileges data collector 404, an access data collector 408, and an access policy generator 412. The processor 110 is configured as part of the privileges data collector 404, as part of the access data collector 408, and as part of the access policy generator 412, by way of the management code 218.

In some embodiments, the system 400 includes permission configuration data 208 collected by the privileges data collector 404. In some, the system 400 includes access attempt outcome data 204 collected by the access data collector 408. In some, the system 400 includes an access policy 410 generated by the access policy generator 412, and the access policy 410 defines at least a portion of an access capability X that has not been exercised sufficiently.

In some embodiments, a system 214 includes an access policy hardening recommendation producer 420. In some, a system 214 includes an access policy violation detector 416. Some embodiments include both the recommendation producer 420 and the access policy violation detector 416.

Other system embodiments are also described herein, either directly or derivable as system versions of described processes or configured media, informed by the extensive discussion herein of computing hardware.

Although specific architectural examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. Embodiments are not limited to the specific examples, component names, optimizations, algorithmic choices, data, data types, access action types, configurations, implementations, arrangements, displays, features, approaches, or scenarios provided herein. A given embodiment may include additional or different technical features, mechanisms, sequences, data structures, or functionalities for instance, and may otherwise depart from the examples provided herein.

Processes (a.k.a. Methods)

Figure 8:
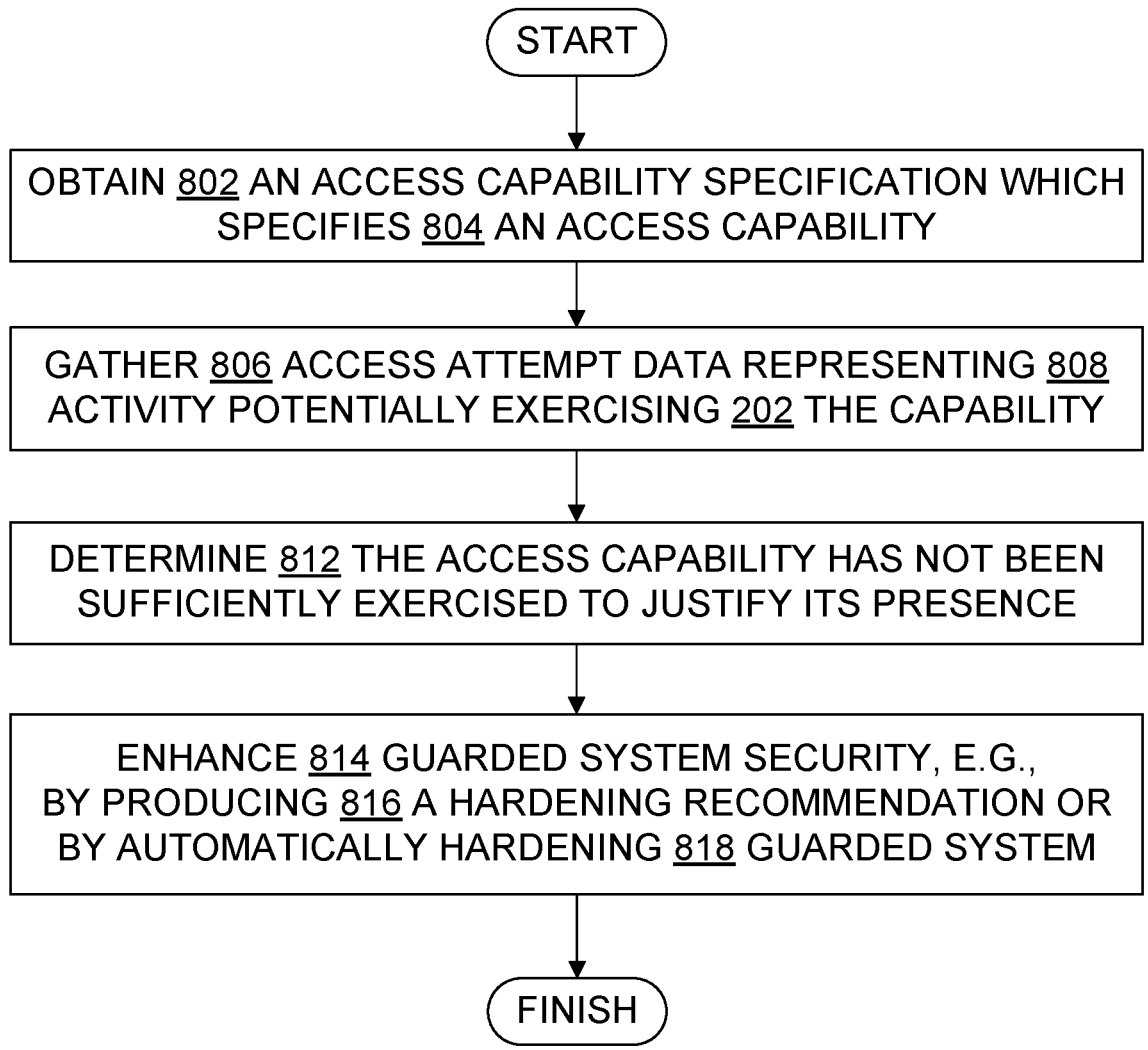
FIG. 8 is a flowchart illustrating steps in some access capability management methods.

FIG. 8 illustrates a method 800 which is an example of methods that may be performed or assisted by an enhanced system with an access capability management functionality such as system 214. The access capability management system 214 obtains 802 an access capability specification 422 which specifies 804 an access capability 200 installed in a guarded computing system 206, gathers 806 access attempt data 204 representing detected activity 202 which attempted to exercise the access capability 200, computationally determines 812 through use of an access capability exercise sufficiency criterion 216 that the access capability 200 has not been exercised sufficiently, and enhances 814 security of the guarded computing system 206 based on a result of the determination 812. Security may be enhanced, e.g., by producing 816 a recommendation 418 for hardening the guarded system 206, or by automatically proactively hardening 818 the guarded system 206.

Figure 9:
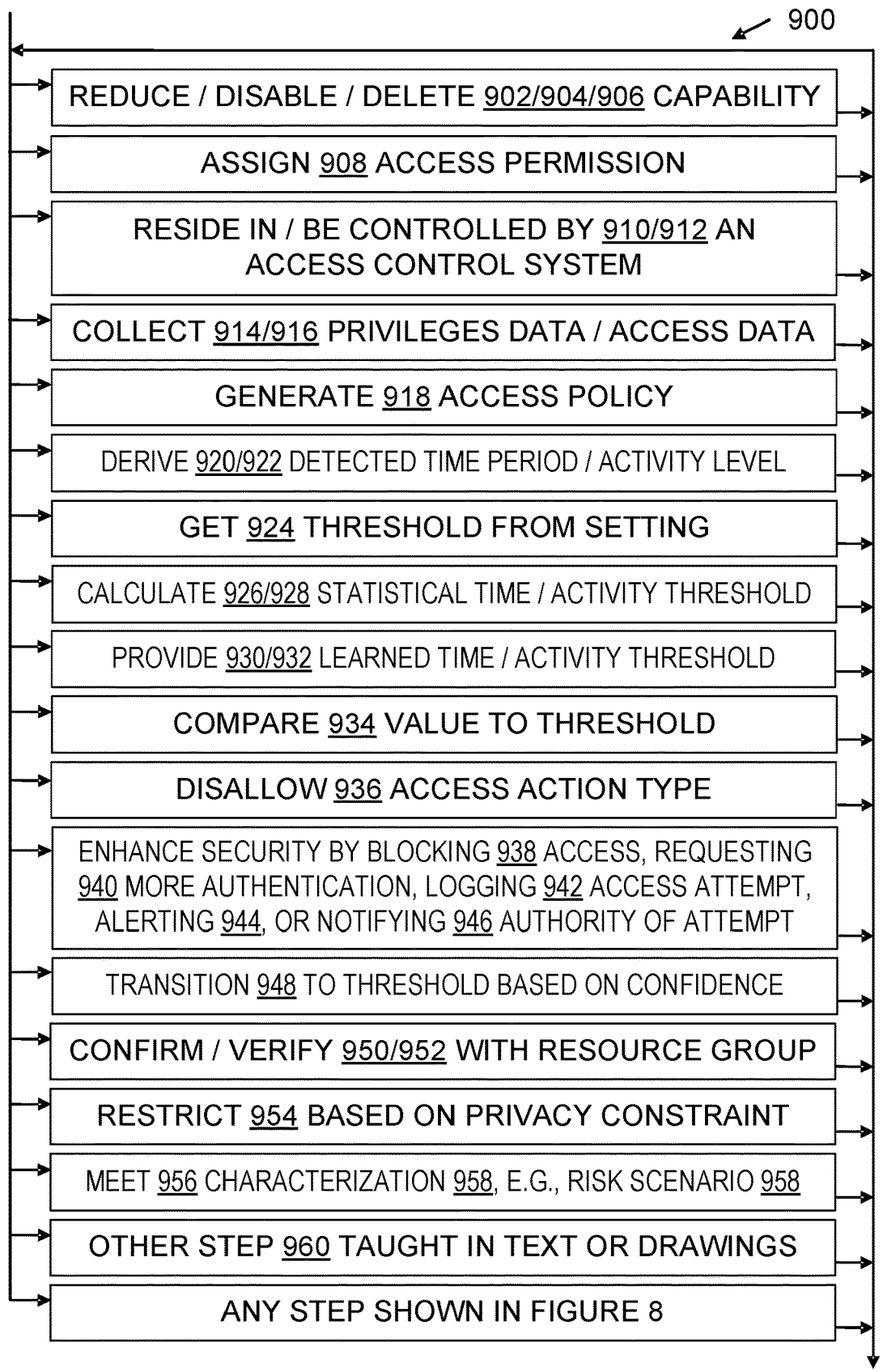
FIG. 9 is a flowchart further illustrating steps in some access capability management methods.

FIG. 9 further illustrates access capability management methods (which may also be referred to as "processes" in the legal sense of that word) that are suitable for use during operation of a system 400 or other system 214 which has access capability management functionality, including some refinements, supplements, or contextual actions for steps shown in FIG. 8. FIG. 9 also incorporates steps shown in FIG. 8. Technical processes shown in the Figures or otherwise disclosed will be performed automatically, e.g., by a cloud services provider's security service, unless otherwise indicated. Processes may also be performed in part automatically and in part manually to the extent action by a human administrator or other human person is implicated, e.g., in some embodiments a person may specify fixed thresholds 612 or 614 for exercise sufficiency determinations. No process contemplated as innovative herein is entirely manual. In a given embodiment zero or more illustrated steps of a process may be repeated, perhaps with different parameters or data to operate on. Steps in an embodiment may also be done in a different order than the top-to-bottom order that is laid out in FIGS. 8 and 9. Steps may be performed serially, in a partially overlapping manner, or fully in parallel. In particular, the order in which flowchart 800 action items or flowchart 900 action items are traversed to indicate the steps performed during a process may vary from one performance of the process to another performance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim.

Some embodiments use or provide an access capability management method, including: obtaining 802 an access capability specification which specifies an access capability installed in a guarded computing system; gathering 806 access attempt data representing detected activity which attempted to exercise the access capability; computationally determining 812 that the access capability has not been exercised sufficiently, based on an access capability exercise sufficiency criterion; and enhancing 814 security of the guarded computing system based on a result of the determining. In some embodiments, enhancing 814 includes automatically performing at least one of the following: producing 816 a recommendation to harden the guarded computing system by reducing 902, disabling 904, or deleting 906 the access capability 200 after computationally determining that the access capability has not been exercised sufficiently, or hardening 818 the guarded computing system by reducing 902, disabling 904, or deleting 906 the access capability 200 after computationally determining that the access capability has not been exercised sufficiently.

In some embodiments, computationally determining 812 that the access capability has not been exercised sufficiently includes deriving 920 a detected time period 604 from at least a portion of the gathered access attempt data, getting 924 a fixed inactivity time period threshold 612 from a user setting or a default setting, and comparing 934 the detected time period to the fixed inactivity time period threshold. A detected time period 604 may be derived 920, e.g., by calculating the difference between a current time and a timestamp of an activity 202 entry in the access attempt data 204, or by calculating the difference between a log's timestamp and a timestamp of an activity 202 entry in the log.

In some embodiments, computationally determining 812 that the access capability has not been exercised sufficiently includes deriving 922 a detected activity level 606 from at least a portion of the gathered access attempt data, getting 924 a fixed activity level threshold 614 from a user setting 608 or a default setting 610, and comparing 934 the detected activity level to the fixed activity level threshold. A detected activity level 606 may be derived 922, e.g., by tallying the number of actions 202 within a time period, e.g., to derive a value of X reads per day, or Y login attempts per week.

In some embodiments, computationally determining 812 that the access capability has not been exercised sufficiently includes deriving 920 a detected time period 604 from at least a portion of the gathered access attempt data, statistically calculating 926 a statistical inactivity time period threshold 616, and comparing 934 the detected time period to the statistical inactivity time period threshold. For example, a statistical inactivity time period threshold 616 may be calculated as a median or mean of: detected inactivity time periods pertaining to an actor of interest, detected inactivity time periods pertaining to a resource of interest, detected inactivity time periods pertaining to a group containing the actor, or detected inactivity time periods pertaining to a group of resources containing the resource. Here and elsewhere herein, "detected" items include those documented in the access activity data 204 or derived therefrom.

In some embodiments, computationally determining 812 that the access capability has not been exercised sufficiently includes deriving 922 a detected activity level from at least a portion of the gathered access attempt data, statistically calculating 928 a statistical activity level threshold 618, and comparing 934 the detected activity level to the statistical activity level threshold.

In some embodiments, computationally determining 812 that the access capability has not been exercised sufficiently includes deriving 920 a detected time period 604 from at least a portion of the gathered access attempt data, providing 930 by machine learning a learned inactivity time period threshold 628, and comparing 934 the detected time period to the learned inactivity time period threshold. The learned inactivity time period threshold 628 may be provided 930 by a machine learning model 426 that has been trained using the access activity data 204 or data derived therefrom. The training and model operation may include, for example, unsupervised learning via clustering.

In some embodiments, computationally determining 812 that the access capability has not been exercised sufficiently includes deriving 922 a detected activity level from at least a portion of the gathered access attempt data, providing 932 by machine learning a learned activity level threshold 630, and comparing 934 the detected activity level to the learned activity level threshold. The learned activity level threshold 630 may be provided 932 by a machine learning model 426 that has been trained using the access activity data 204 or data 428 derived from access activity data 204. The training and model operation may include, for example, unsupervised learning via clustering.

In some embodiments, enhancing 814 security of the guarded computing system further includes at least one of the following: automatically blocking 938 an attempted access e.g., by terminating a connection or diverting a connection to a security page, requesting 940 different authentication such as an additional factor of a multifactor authentication as a condition of not blocking an attempted access, logging 942 an attempted access into a syslog or audit trail or other record of activity, alerting 944 on an attempted access by messaging a SIEM or otherwise, notifying 946 an administrator of an attempted access by text or email or popup or other communication mechanism, or notifying 946 security personnel of an attempted access by similar communication mechanisms.

In some embodiments, the method includes transitioning 948 between using a fixed inactivity time period threshold in the access capability exercise sufficiency criterion and using a statistical inactivity time period threshold in the access capability exercise sufficiency criterion. The transitioning 948 is based at least partially on a confidence threshold that is associated with the statistical inactivity time period threshold. Thus, when there is sufficient confidence in the helpfulness of the statistical inactivity time period threshold it is used, and otherwise the fixed inactivity time period threshold is used. An embodiment may also transition 948 from, e.g., learned to statistical to fixed thresholds, or from statistical to learned to fixed thresholds, or from one learned threshold to another learned threshold, and so on, based on confidence levels.

In some embodiments, the method includes transitioning 948 between using a fixed inactivity time period threshold in the access capability exercise sufficiency criterion and using a learned inactivity time period threshold in the access capability exercise sufficiency criterion. Transitioning 948 is based at least partially on a confidence threshold that is associated with the learned inactivity time period threshold. As noted, transitioning need not be direct; one or more intervening thresholds may be used in addition to the fixed and learned thresholds noted here.

In some embodiments, the method includes transitioning 948 between using a fixed activity level threshold in the access capability exercise sufficiency criterion and using a statistical activity level threshold in the access capability exercise sufficiency criterion. Transitioning 948 is based at least partially on a confidence threshold that is associated with the statistical activity level threshold. As noted, transitioning need not be direct; one or more intervening thresholds may be used in addition to the fixed and statistical thresholds noted here.

In some embodiments, the method includes transitioning 948 between using a fixed activity level threshold in the access capability exercise sufficiency criterion and using a learned activity level threshold in the access capability exercise sufficiency criterion. Transitioning 948 is based at least partially on a confidence threshold that is associated with the learned activity level threshold. As noted, transitioning need not be direct; one or more intervening thresholds may be used in addition to the fixed and learned thresholds noted here.

In some embodiments and some situations, the access capability management method manages access by an actor to a computational resource using an assigned permission, and the computational resource belongs to a computational resource group 510. Then the method may do the following prior to enhancing security of the guarded computing system with regard to the access capability: confirm 950 that each computational resource R of the computational resource group has the same assigned permission regarding access by the actor, and verify 952 that access by the actor to each computational resource R has not been exercised sufficiently. This may be done to help avoid interfering with legitimate user activity when one resource of a group is underutilized but the permissions apply as well to other resources of the group which might not be underutilized.

In some embodiments and some situations, the method further includes restricting 954 at least one of the obtaining, gathering, determining, or enhancing to a proper subset of actors of the computing system, based on a privacy constraint 528. In particular, privacy law or regulation compliance may be accomplished by not gathering 806 activity data about residents of a particular jurisdiction, and accordingly not determining 812 whether their access capabilities 200 are insufficiently exercised, and not doing any hardening 818 that would have been based solely on such determinations 812.

Some embodiments are tailored to, motivated by, or otherwise closely associated with particular situations, also referred to herein as risk scenarios 958. In some, an access capability that has not been exercised sufficiently is further characterized by matching a risk scenario 958. That is, an embodiment may meet 956 a functionality characterization 958 corresponding to a scenario 958.

In one such scenario 958, an access capability 200 granted an access permission to an actor when the actor had different organizational responsibilities than the actor's current organizational responsibilities. For instance, suppose an employee overseeing manufacturing equipment received access to factory machinery and to the control and configuration data that drives such machinery and to the widget production data such machinery produces. Then the employee was transferred to a sales position which does not require that access to factory machinery resources. The factory machinery resource access capability could be identified by an embodiment as a vulnerability 702, and the factory machinery resources system 206 could be hardened by disabling or deleting the access capability. Similarly, a change in organizational responsibilities could occur as a result of retirement or termination, leaving behind unnecessary access capabilities that an embodiment may discover automatically.

In another scenario 958, an access capability 200 grants an actor permission to access any of a set of computational resources and the actor has only accessed a proper subset of that set. For instance, suppose A asks B for access to update a file F1 which resides in a directory D with other files F2 . . . Fn. B then grants A permission to update any file of D. This provides A with the desired capability, but also provides capabilities A did not request and may well not need. Indeed, A may not even be aware of the potential to access F2 . . . Fn, and in any case A may limit its write activities 202 to F1. An embodiment may discover this situation, and may recommend updates 710 to limit A's write permission to file F1, disallowing A from writing any of the other files F2 . . . Fn.

In another scenario 958, an access capability 200 was installed by default. Many devices have admin accounts by default, often with easily located default passwords. An embodiment may discover this, and recommend updates 710 to either remove the admin account if it is not used and is unlikely to be needed, or at least change the password from the default value.

Somewhat similarly, virtual machines 306, employee workstations in large organizations, and some other machines are sometimes configured using a baseline that they each (at least at some point) all share. In some cases, an access capability was installed as part of such a baseline configuration. This may create an unwanted security vulnerability 702, since a breach in any one of the identically configured machines leads readily to a breach in all of them.

In some embodiments, enhancing security of a guarded computing system includes disallowing 936 an access action type 640 which the access capability allowed prior to the enhancing. For example, write actions may be disallowed.

Configured Storage Media

Some embodiments include a configured computer-readable storage medium 112. Storage medium 112 may include disks (magnetic, optical, or otherwise), RAM, EEPROMS or other ROMs, and/or other configurable memory, including in particular computer-readable storage media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as access capability management code 218, an exercise sufficiency criterion 216, capability specification 422, policy 410, recommendation 418, model 426, and exercise sufficiency basis aspects 602, in the form of data 118 and instructions 116, read from a removable storage medium 114 and/or another source such as a network connection, to form a configured storage medium. The configured storage medium 112 is capable of causing a computer system 102 to perform technical process steps for access capability management, as disclosed herein. The Figures thus help illustrate configured storage media embodiments and process (a.k.a. method) embodiments, as well as system and process embodiments. In particular, any of the process steps illustrated in FIG. 8 or 9, or otherwise taught herein, may be used to help configure a storage medium to form a configured storage medium embodiment.

Some embodiments use or provide a computer-readable storage medium 112, 114 configured with data 118 and instructions 116 which upon execution by at least one processor 110 cause one or more devices to perform an access capability management method. This method includes obtaining 802 an access capability specification which specifies an access capability installed in a guarded computing system. In this example, the access capability specification 422 includes an identification 526 of a computational resource; the identification 526 identifies the computational resource explicitly, or implicitly as part of a set of computational resources 212. This method also includes gathering 806 access attempt data representing detected activity 202 which attempted to exercise the access capability, and computationally determining 812 that the access capability has not been exercised sufficiently. The determination 812 is based on an access capability exercise sufficiency criterion 216. This method also includes enhancing 814 security of the guarded computing system based on a result of the determining, by automatically performing at least one of the following: producing 816 a recommendation to harden the guarded computing system by reducing, disabling, or deleting the access capability after computationally determining that the access capability has not been exercised sufficiently, or hardening 818 the guarded computing system by reducing, disabling, or deleting the access capability after computationally determining that the access capability has not been exercised sufficiently.

In some embodiments, the determining 812 is based on at least one of the following criteria 216: an actor has not attempted to access the computational resource within a fixed inactivity time period; an actor has not attempted to access the computational resource within a statistical inactivity time period; an actor has not attempted to access the computational resource within a learned inactivity time period; an activity measure of detected attempts to access the computational resource is less than a fixed activity level threshold; an activity measure of detected attempts to access the computational resource is less than a statistical activity level threshold; or an activity measure of detected attempts to access the computational resource is less than a learned activity level threshold.

In some embodiments, the determining 812 is based on a criteria 216 that an amount of attempts to access the computational resource is below a specified threshold, and unsuccessful attempts, if any, are not excluded when tallying the amount. In some, the determining 812 is based on a criteria 216 that an amount of successful attempts to access the computational resource is below a specified threshold.

In some embodiments, the security enhancing 814 includes monitoring access attempts and responding to an access attempt that invokes a permission that has not been exercised sufficiently. The responding includes at least one of the following: automatically blocking the attempted access, or automatically requesting different authentication as a condition of not blocking the attempted access.

In some embodiments, the security enhancing 814 includes monitoring access attempts and responding to an access attempt that invokes a permission that has not been exercised sufficiently, and the responding includes at least one of the following: logging the attempted access, alerting on the attempted access, notifying an administrator of the attempted access, or notifying security personnel of the attempted access.

Additional Examples and Observations

One of skill will recognize that not every part of this disclosure, or any particular details therein, are necessarily required to satisfy legal criteria such as enablement, written description, or best mode. Also, embodiments are not limited to the particular networks, protocols, tools, identifiers, fields, data structures, functions, secrets or other proofs, or other implementation choices described herein. Any apparent conflict with any other patent disclosure, even from the owner of the present innovations, has no role in interpreting the claims presented in this patent disclosure. With this understanding, which pertains to all parts of the present disclosure, some additional examples and observations are offered.

Some embodiments use or provide a system and method for access policy hardening based on access request monitoring. By way of context, organizations and their information technology (IT) departments are struggling to protect their computational resources 212. Even relatively small businesses might have thousands of resources, with very limited ability to track them and to make sure they are all well protected. As a result, resources are left accessible to parties that don't require access, thus becoming vulnerable to adversaries who might exploit that access capability. Today, in the cloud and IoT era, it is easier than before to create massive amounts of resources and IT departments are no longer centralized, so the problem unnecessary access capabilities is even more predominant. Embodiments described herein may be employed to decrease the attack surface of computational resources by learning usage patterns and restricting unnecessary access privileges.

Some embodiments provide or perform a method of access capability management, or provide or use a system which performs a method of access capability management, or provide or use a storage medium configured with software which upon execution performs an access capability management method. Accordingly, the recital of methods below herein not only methods per se, but also systems and configured storage media.

Some embodiments involve a method of managing access to computational resources of a computing system, with the method including obtaining 802 permission configuration data including an actor identification, a computational resource identification, and an assigned permission regarding access by the actor to the computational resource. This may be performed, e.g., by a privileges data collector 404. This method also includes gathering 806 access attempt outcome data including the actor identification, the computational resource identification, and an outcome of an attempt by the actor to access the computational resource. This may be performed, e.g., by an access data collector 408. This method also includes computationally determining 812 that the permission regarding access by the actor to the computational resource has not been exercised sufficiently, based on a permission exercise sufficiency criterion. This may be performed, e.g., by a policy generator 412. This method also includes enhancing 814 security of the computing system based on a result of the determining. This may be performed, e.g., by a violation detector 416, a recommendation producer 420, or both.

In some embodiments, the determining 812 is based on at least one of the following criteria 216: the actor of interest has not attempted to access the computational resource within a fixed inactivity time period, or no attempts to access the computational resource have been made within a fixed inactivity time period by the actor of interest or any other actor.

In some embodiments, the determining 812 is based on at least one of the following criteria 216: the actor of interest has not attempted to access the computational resource within a calculated inactivity time period that was calculated statistically, the actor of interest has not attempted to access the computational resource within a calculated inactivity time period that was calculated by a machine learning model, no attempts to access the computational resource have been made within a calculated inactivity time period that was calculated statistically, or no attempts to access the computational resource have been made within a calculated inactivity time period that was calculated by a machine learning model.

However, embodiments are not necessarily limited to those whose criteria 216 involve no attempt at all or complete inactivity. A criterion 216 can also use low activity as a threshold. A statistical model or a machine learning model may be used to specify what is considered "relatively low" for a certain customer. For example, for a customer A having 10 attempts may be small enough number since all other actors are using the resource at least a 1000 times a day, so the machine learning model will provide a threshold higher than 10. But for a customer B having 3 attempts is large enough to avoid insufficient exercise, since all other actors are using the resource only 3-5 times a day, and the statistical model will recommend continuing to permit access to B in this example.

In some embodiments, the method further includes transitioning 948 between using the calculated inactivity time period as the permission exercise sufficiency criterion and using a fixed inactivity time period as the permission exercise sufficiency criterion. The transitioning is based at least partially on a confidence threshold that is associated with the calculated inactivity time period.

Some embodiments build on the information gained about the permissions given vs. the permissions actually being used, by recommending to an admin that the admin reduce or remove given permissions that are not being used. This is also referred to as recommending "hardening" or as recommending "reducing the attack surface". In some, a method includes producing 816 a recommendation to harden the computing system by reducing, disabling, or deleting the permission after computationally determining that the permission has not been exercised sufficiently. In some, instead of recommending hardening, the system is automatically hardened. That is, the method includes automatically hardening 818 the computing system by reducing, disabling, or deleting the permission after computationally determining that the permission has not been exercised sufficiently.

One of skill will acknowledge that actors and resources get connected with permissions in various ways. For example, in some discretionary access control systems 502 the permissions are assigned to resources by resource owners, e.g., the creator of a file can set the read, write, and execute permissions on that file. As another example, in some mandatory access control systems 504 the access requirements are set by administrators and cannot be changed by other users, e.g., a user with a secret clearance level 518 may be able to access a file that is classified as secret, but be unable to access top secret files and unable to change the classification 520 of any file. Embodiments are not necessarily limited to any particular way of associating actors and resources with permissions. So the permission configuration data 208 may be consistent with a discretionary access control approach, or be consistent with a mandatory access control approach, for example.

One of skill will acknowledge that attempts to access a resource 212 may have various outcomes, such as success, failure, or indeterminate (e.g., not enough info in the log to determine whether the attempt succeeded). Some embodiments are not necessarily limited to considering only successful access attempts. In some scenarios, a lack of any attempts invoking a permission could be a reason to harden a system by removing the permission. In other scenarios, a lack of any successful attempts invoking a permission could be a reason to harden a system by removing the permission even if there have been unsuccessful attempts. For example, the determining 812 may be based on one of the following: a lack of any attempts by the actor that invoke the permission within a specified time period, or a lack of any successful attempts by the actor that invoke the permission within a specified time period.

Some Additional Combinations and Variations

Any of these combinations of code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

CONCLUSION

In short, the teachings provided herein may be applied to computing systems 102 in a cloud 302 or elsewhere, and thereby provide access capability management enhancements that identify or reduce (or both) security vulnerabilities in the form of apparently unnecessary access grants. Some embodiments provide improved 814 security in particular access capability vulnerability situations. In some of these situations, a user 104 or another actor 506 has a permission 522, a clearance level 518, or another capability 200 that is required to access a file, a service, a virtual machine 306, or another computational resource 212, but the actor 506 has apparently not exercised that access capability 200 enough to justify allowing the access capability to remain in place. Some access capability management embodiments obtain 802 an access capability specification 422 which specifies an access capability 200 installed in a guarded computing system 206. These embodiments also gather 806 access attempt data 204 representing detected activity 202 which attempted to exercise the access capability 200. Then these embodiments computationally determine 812 that the access capability 200 has not been exercised sufficiently, based on an access capability exercise sufficiency criterion 216. These embodiments may then enhance 814 security of the guarded computing system 206, based on a result of the determining 812. In some cases, security enhancement 814 is performed by an embodiment automatically producing 816 a recommendation 418 to harden 818 the guarded computing system 206 by reducing 902, disabling 904, or deleting 906 the insufficiently exercised access capability 200. In some cases, security enhancement 814 is performed by an embodiment automatically hardening 818 the guarded computing system 206 by reducing 902, disabling 904, or deleting 906 the insufficiently exercised access capability 200.

In operation, some embodiments may use various technical mechanisms when computationally determining 812 that the access capability 200 has not been exercised sufficiently, e.g., mechanisms 216 and 218 may be based in part on a fixed time period threshold 612, a fixed activity level threshold 614, a statistical time period threshold 616, a statistical activity level threshold 618, a learned time period threshold 828, a learned activity level threshold 630, or a combination thereof based on confidence levels. Thresholds may be compared 934 to a detected time period value 604 or a detected activity level value 606 that is derived 920 or 922 from the access attempt data 204.

In operation, some embodiments may use various technical mechanisms for balancing security vulnerability mitigation against potential interference with legitimate user activity, e.g., by requesting 940 different authentication rather than simply blocking 938 access, by logging 942 or alerting 944 or notifying 946 as opposed to blocking 938 access, by restricting 954 impact on access capabilities 200 in view of a privacy constraint 528, by avoiding 950 and 952 resource group access capability reduction when only part of a resource group 510 is being accessed, or by recognizing 956 certain vulnerability scenarios 958 which may give rise to unnecessary grants of access capability 200. Combinations of these may also be employed.

Embodiments are understood to also themselves include or benefit from tested and appropriate security controls and privacy controls such as the General Data Protection Regulation (GDPR), e.g., it is understood that appropriate measures should be taken to help prevent misuse of computing systems through the injection or activation of malware and help avoid tampering with any personal or private information the enhanced system may process during program execution. Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with FIGS. 8 and 9 also help describe configured storage media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, specific kinds of components, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. An access capability management system, comprising:
a memory;
a processor in operable communication with the memory, the processor configured to perform access capability management steps which include (a) obtaining an access capability specification which specifies an access capability installed in a guarded computing system, (b) gathering access attempt data representing detected activity which attempted to exercise the access capability, (c) computationally determining that the access capability has not been exercised sufficiently, based on an access capability exercise sufficiency criterion, (d) enhancing security of the guarded computing system based on a result of the determining, and (e) restricting at least one of the obtaining, gathering, determining, or enhancing to a proper subset of actors of the computing system, in order to comply with a privacy constraint of the access capability management system.

2. The system of claim 1, wherein enhancing security of the guarded computing system includes at least one of the following:
producing a recommendation to harden the guarded computing system by reducing, disabling, or deleting the access capability after computationally determining that the access capability has not been exercised sufficiently; or hardening the guarded computing system by reducing, disabling, or deleting the access capability after computationally determining that the access capability has not been exercised sufficiently.

3. The system of claim 1, wherein the access capability resides in or is controlled by an access control system of the guarded computing system, and wherein the access control system includes at least one of the following:

a discretionary access control system; or a mandatory access control system.

4. The system of claim 1, wherein the access capability specification includes at least one of the following:

an actor identification;

a group identification;

a role identification;

a computational resource identification;

an assigned permission regarding access to a computational resource;

an assigned permission regarding a computational resource access activity;

a computational resource classification;

a security clearance level;

a need-to-know identification; or a privacy constraint.

5. The system of claim 1, wherein the system comprises a privileges data collector, an access data collector, and an access policy generator, and wherein the processor is configured as part of the privileges data collector, the processor is also configured as part of the access data collector, and the processor is also configured as part of the access policy generator.

6. The system of claim 5, wherein the system further comprises at least one of the following:

permission configuration data collected by the privileges data collector;

access attempt outcome data collected by the access data collector; or an access policy generated by the access policy generator which defines at least a portion of an access capability X that has not been exercised sufficiently.

7. The system of claim 5, wherein the system further comprises at least one of the following:

an access policy hardening recommendation producer; or an access policy violation detector.

8. An access capability management method, comprising:

obtaining an access capability specification which specifies an access capability installed in a guarded computing system;

gathering access attempt data representing detected activity which attempted to exercise the access capability;

computationally determining that the access capability has not been exercised sufficiently, based on an access capability exercise sufficiency criterion; and enhancing security of the guarded computing system based on a result of the determining by automatically performing at least one of the following:

producing a recommendation to harden the guarded computing system by reducing, disabling, or deleting the access capability after computationally determining that the access capability has not been exercised sufficiently; or hardening the guarded computing system by reducing, disabling, or deleting the access capability after computationally determining that the access capability has not been exercised sufficiently; and wherein the access capability that has not been exercised sufficiently is further characterized by matching at least one of the following scenarios:

the access capability granted an access permission to an actor when the actor had different organizational responsibilities than the actor's current organizational responsibilities;

the access capability granted an actor permission to access any of a set of computational resources and the actor has only accessed a proper subset of that set;

the access capability was installed by default; or the access capability was installed as part of a baseline configuration.

9. The method of claim 8, wherein computationally determining that the access capability has not been exercised sufficiently comprises at least one of the following:

deriving a detected time period from at least a portion of the gathered access attempt data, getting a fixed inactivity time period threshold from a user setting or a default setting, and comparing the detected time period to the fixed inactivity time period threshold;

deriving a detected activity level from at least a portion of the gathered access attempt data, getting a fixed activity level threshold from a user setting or a default setting, and comparing the detected activity level to the fixed activity level threshold;

deriving a detected time period from at least a portion of the gathered access attempt data, statistically calculating a statistical inactivity time period threshold, and comparing the detected time period to the statistical inactivity time period threshold;

deriving a detected activity level from at least a portion of the gathered access attempt data, statistically calculating a statistical activity level threshold, and comparing the detected activity level to the statistical activity level threshold;

deriving a detected time period from at least a portion of the gathered access attempt data, providing by machine learning a learned inactivity time period threshold, and comparing the detected time period to the learned inactivity time period threshold; or deriving a detected activity level from at least a portion of the gathered access attempt data, providing by machine learning a learned activity level threshold, and comparing the detected activity level to the learned activity level threshold.

10. The method of claim 8, wherein enhancing security of the guarded computing system further comprises at least one of the following:

automatically blocking an attempted access;

requesting different authentication as a condition of not blocking an attempted access;

logging an attempted access;

alerting on an attempted access;

notifying an administrator of an attempted access; or notifying security personnel of an attempted access.

11. The method of claim 8, further comprising at least one of the following:

transitioning between using a fixed inactivity time period threshold in the access capability exercise sufficiency criterion and using a statistical inactivity time period threshold in the access capability exercise sufficiency criterion, said transitioning based at least partially on a confidence threshold that is associated with the statistical inactivity time period threshold;
transitioning between using a fixed inactivity time period threshold in the access capability exercise sufficiency criterion and using a learned inactivity time period threshold in the access capability exercise sufficiency criterion, said transitioning based at least partially on a confidence threshold that is associated with the learned inactivity time period threshold;
transitioning between using a fixed activity level threshold in the access capability exercise sufficiency criterion and using a statistical activity level threshold in the access capability exercise sufficiency criterion, said transitioning based at least partially on a confidence threshold that is associated with the statistical activity level threshold; or
transitioning between using a fixed activity level threshold in the access capability exercise sufficiency criterion and using a learned activity level threshold in the access capability exercise sufficiency criterion, said transitioning based at least partially on a confidence threshold that is associated with the learned activity level threshold.

12. The method of claim 8, wherein the method manages access by an actor to a computational resource using an assigned permission, the computational resource belongs to a computational resource group; and the method further comprises the following prior to enhancing security of the guarded computing system with regard to the access capability:
confirming that each computational resource R of the computational resource group has the same assigned permission regarding access by the actor; and
verifying that access by the actor to each computational resource R has not been exercised sufficiently.

13. The method of claim 8, wherein the method further comprises restricting at least one of the obtaining, gathering, determining, or enhancing to a proper subset of actors of the computing system, based on a privacy constraint.

14. The method of claim 8, wherein the access capability that has not been exercised sufficiently is installed as part of a baseline configuration used to configure multiple machines.

15. The method of claim 8, wherein enhancing security of the guarded computing system comprises disallowing an access action type which the access capability allowed prior to the enhancing.

16. A computer-readable storage medium configured with data and instructions which upon execution by at least one processor cause one or more devices to perform an access capability management method, the method comprising:
obtaining an access capability specification which specifies an access capability installed in a guarded computing system, the access capability specification including an identification of a computational resource, wherein the identification identifies the computational resource explicitly, or implicitly as part of a set of computational resources;
gathering access attempt data representing detected activity which attempted to exercise the access capability;
computationally determining that the access capability has not been exercised sufficiently, based on an access capability exercise sufficiency criterion; and
enhancing security of the guarded computing system based on a result of the determining by automatically performing at least one of the following:
producing a recommendation to harden the guarded computing system by reducing, disabling, or deleting the access capability after computationally determining that the access capability has not been exercised sufficiently; or
hardening the guarded computing system by reducing, disabling, or deleting the access capability after computationally determining that the access capability has not been exercised sufficiently; and
restricting at least one of the obtaining, gathering, determining, or enhancing to a proper subset of actors of the computing system, in order to comply with a privacy constraint of an access capability management system.

17. The computer-readable storage medium of claim 16, wherein the determining is based on at least one of the following criteria:
an actor has not attempted to access the computational resource within a fixed inactivity time period;
an actor has not attempted to access the computational resource within a statistical inactivity time period;
an actor has not attempted to access the computational resource within a learned inactivity time period;
an activity measure of detected attempts to access the computational resource is less than a fixed activity level threshold;
an activity measure of detected attempts to access the computational resource is less than a statistical activity level threshold; or
an activity measure of detected attempts to access the computational resource is less than a learned activity level threshold.

18. The computer-readable storage medium of claim 16, wherein the determining is based on at least one of the following criteria:
an amount of attempts to access the computational resource is below a specified threshold, wherein unsuccessful attempts, if any, are not excluded when tallying the amount; or
an amount of successful attempts to access the computational resource is below a specified threshold.

19. The computer-readable storage medium of claim 16, wherein the enhancing comprises monitoring access attempts and responding to an access attempt that invokes a permission that has not been exercised sufficiently, and wherein responding includes at least one of the following:
automatically blocking the attempted access; or
automatically requesting different authentication as a condition of not blocking the attempted access.

20. The computer-readable storage medium of claim 16, wherein the enhancing comprises monitoring access attempts and responding to an access attempt that invokes a permission that has not been exercised sufficiently, and wherein responding includes at least one of the following:
logging the attempted access;
alerting on the attempted access;
notifying an administrator of the attempted access; or
notifying security personnel of the attempted access.

\* \* \* \* \*